United States Patent Office 3,489,632
Patented Jan. 13, 1970

3,489,632
DIRECT-FIELD SEALING OF WAXED PAPERBOARD LAYERS
Myer H. Hecht, 1429 Central Ave., Deerfield, Ill. 60015
Continuation-in-part of application Ser. No. 797,865, Mar. 9, 1959. This application Dec. 5, 1966, Ser. No. 599,202
The portion of the term of the patent subsequent to June 8, 1982, has been disclaimed
Int. Cl. B32b 31/06
U.S. Cl. 156—273    10 Claims

ABSTRACT OF THE DISCLOSURE

This invention relates to the direct-field sealing of waxed paperboard layers. In one embodiment of the invention a water-based adhesive is interposed between the surfaces of two waxed paperboard layers. The paperboard laryers are then inserted between opposing electrodes and subjected to pressure while a radio frequency field is maintained between the two electrodes. A fiber-tearing bond results. In another embodiment of the invention additives are blended into the wax before the wax is applied to the paperboard in order to raise the viscosity of the wax to a point where it will be viscous and tacky near or at its melt point. These additives may advantageously be co-polymers of ethylene with vinyl acetate or ethyl acrylate. The paperboard layers are then compressed and inserted between the electrodes where they are subjected to a radio frequency field. Again, a fiber-tearing bond results.

---

This application is a continuation in part of my prior applications, Ser. No. 797,865, filed Mar. 9, 1959, and now abandoned, Ser. No. 221,670, filed Sept. 4, 1962, now Patent No. 3,291,671, and Ser. No. 500,288, filed Oct. 21, 1965 and now abandoned.

The invention has particular utility in fabricating such paperboard containers as half-gallon ice cream cartons, gabled-top milk cartons, recessed, plug-type milk cartons, and other food containers.

In the past, such cartons have been sealed by heat which is supplied by a heated platen that transfers its heat by conductance. A primary advantage of applicant's method over heat sealing is speed. Other important advantages of applicant's method are that no wax scorching, wax unsightliness, or off-odors result. The paper is not scorched or discolored, and the wax adjacent the seal area, which is important for waterproofing the carton, remains relatively undisturbed during the sealing operation. In addition, the printing in areas adjacent the sealing area is not damaged.

The temperature of heated platens that would be required to seal two or three layers of waxed paperboard at economic and commercially practical speeds would scorch both wax and board in and adjacent to the seal areas and damage any printing in the adjacent nonseal areas. Conversely, the length of time required and the equipment needed to seal waxed paperboard layers with heated platens at non-destructive temperatures generally make this procedure commercially unattractive.

Rather than the use of heated platens, milk car'ons, for example, have also been fabricated by first applying conventional heat to remove the wax on the carton before the side-seam is joined by means of adhesive or tape, and the gabled tops of the cartons have been joined by staples.

It is, therefore, a principal object of this invention to provide a method for sealing waxed paperboard cartons. More particularly, an object of this invention is to provide a fast method for sealing waxed paperboard cartons in such a manner that no wax scorching or discoloration occurs.

Another object of this invention is to provide a method for uniting waxed paperboard layers in which a water-based adhesive is introduced between wax-covered paperboard layers and layers are then introduced into a direct radio frequency field. Other objects and advantages of the invention will be apparent as the specification proceeds.

The invention will be described in conjunction with the accompanying drawing, which is a schematic representation of two embodiments of the invention.

The invention contemplates the use of dielectric heating of the direct-field type, wherein the sealing electrodes are on opposite sides of the material being sealed. Apparatus of this nature can be found in Pitman, U.S. Patent No. 2,087,484, and in my co-pending application, Ser. No. 221,670, filed Sept. 4, 1962. Direct-field sealing is in contrast to the stray-field method disclosed in Richardson et al., U.S. Patent No. 2,631,642, and in my patent, U.S. Patent No. 3,188,257.

Figure 1:
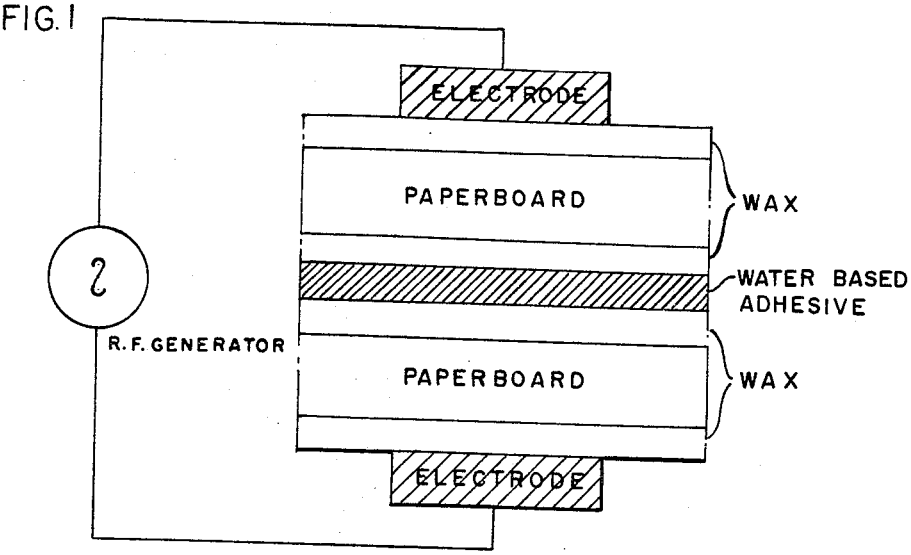
FIGURE 1 is a schematic representation of one embodiment of the present invention.
Figure 2:
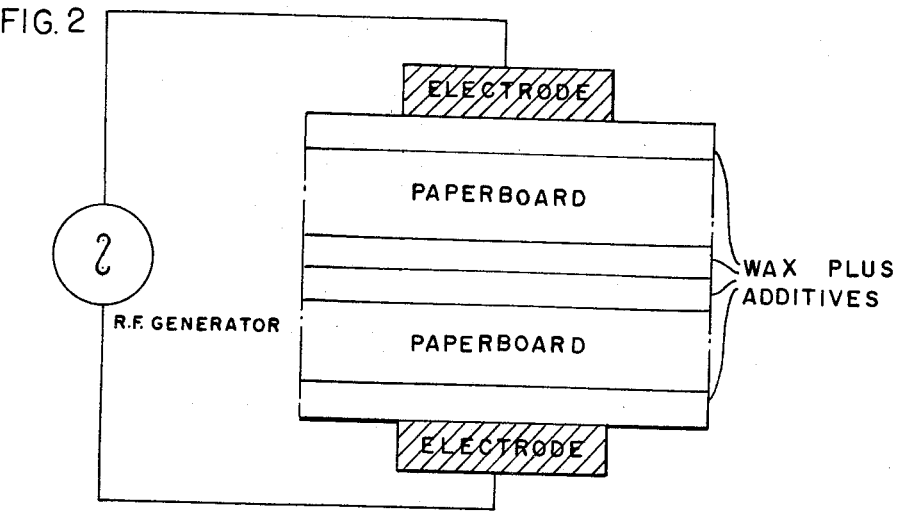
FIGURE 2 is a schematic representation of another embodiment of the present invention.

In one embodiment of the invention, a pair of waxed paperboard layers are provided. The layers may be portions of a flat carton or container blank in essentially two-dimensional form that may be sealed on automatic carton fabricating equipment, such as a straight line folder-gluer, or on a section of what is known in the folding carton industry as a right-angle gluer. The sealing operation produces what is known as a "knocked-down" (KD) or "knocked-down flat" (KDF) substantially flat two-dimensional carton. Alternatively, the flat carton blank may be sealed during erection into a three-dimensional structure on automatic packaging equipment, generally in a packaging plant. Another alternative is the sealing of the layers of the flat blank over a mandrel to produce a three-dimensional fiber tube of rectangular, trapezoidal, triangular, round, or conical design.

The carton or container itself can be constructed of a wide variety of paperboard materials. The paperboard may be of Fourdrinier, cylinder, or Inverform manufacture—in the normal caliper range of about .006" or .007" to about .040", although higher or lower calipers are suitable as the occasion may require or permit.

The paperboard may contain all virgin fibers, all reclaimed fibers, or a blend or combination of virgin and reclaimed fibers. It may be in the form of kraft, natural, colored, or bleached white cartonboard or containerboard. It may or may not be clay-coated for printing on or off the paperboard-making machine. The paperboard may also have a moisture content, and this moisture content may be as much as 5–8% by weight.

The paperboard may be single, laminated to paper, or combined, for example, in the form of corrugated or solid fiber. It may be printed or unprinted, and may be waxed in the web (i.e., in roll form), in sheets, or in the form of scored (creased) die-cut carton or container blanks. It may also be waxed in the form of a side-sealed, partially set-up, or set-up container, generally by dipping.

The wax employed may take the form of paraffin wax, or a mixture of paraffin waxes, or paraffin wax or waxes containing such additives as microcrystalline wax, polyethylene, polypropylene, Polymekon (a product of the Warwick Wax Co., New York City, reported to be a reaction product of polyethylene and microcrystalline wax), polyisobutylene, butyl rubber, Paraflint (a product of Moore & Munger Co., New York City, reported to be a high melt point synthetic paraffin wax, also known as a Fischer-Tropsch Wax), hydrocarbon resins, terpene resins, styrene and styrene co-polymer resins, rosin derivatives, ethylene-vinyl acetate co-polymer resins (such as Elvax, a series of products of the Du Pont Co., Wilmington, Del.), ethylene-ethyl acrylate co-polymer resins, and mixtures or combinations of the same.

Microcrystalline wax, blends of microcrystalline wax, synthetic wax or waxes may also be used. Also suitable are many wax-like materials of a resinous or polymeric nature characterized by being heat-activated and softened by heat, and possessing a relatively low viscosity at about their melting points. Such materials, when heated to or near their melt points, fuse and tend to flow away from the board surface in the area where the seal is to be effected.

The process involved in waxing a paperboard layer may be: (1) impregnation through squeeze rolls, or by dipping; (2) "hot" waxing, which is surface type waxing where the wax, applied hot and molten, is not suddenly chilled, and where some of the wax generally sinks beneath the paperboard surface. One or both surfaces of the paperboard layer may be so waxed; (3) "cold" waxing, or "cold water" waxing, which is a surface type waxing where the wax, though applied hot and molten, is suddenly chilled after deposition on the paperboard by submersion in a bath of cold water, to develop gloss and to cause most of it to lie up on both paperboard surfaces rather than striking in beneath the surface as some or much of it does in the "hot" waxing process; (4) "cast" waxing, which is a variation of the "cold" waxing process where, after application, the wax on one paperboard surface is post-heated before being chilled against a smooth, polished metal surface or by a fountain of cold water. As with the "cold" waxing process, a comparatively heavy wax film is deposited on at least one of the two board surfaces. For purposes of this application the "curtain coating" process will be considered as one type of cast waxing.

The resulting amount of wax taken up by the layer of paperboard may be approximately ½ pound of wax per thousand square feet (M s.f.) of paperboard (or less) as in "hot" waxing; approximately 2 to 5 lbs./M s.f. (or more) as in "cast" waxing; 4 to 8 lbs./M s.f. as in "cold" waxing; or wax weight approximately equal to or greater than ½ the weight of the paperboard when corrugated board is impregnated, frequently by dipping, for the production of moisture-resistant containers. Either one or both of the mating paperboard surfaces of each paperboard layer during the sealing operation will have wax either on the surface, in the interstices of the board fibers at and below surface level, or inside the fibers or coating them at and below surface level. There may be as much as 1 mil (.001″) thickness of wax, or more, on top of at least one mating paperboard surface per layer when waxed by the cold, cast or dipping process.

A water-based adhesive may be superposed over one or both of the surfaces of the waxed paperboard layers. The appropriate surface of the other waxed paperboard layer is then folded into intimate face-to-face contact between two electrodes connected to a radio frequency generator, the one electrode considered positive, the other negative, and while the mating paperboard surfaces are maintained in contact, a current is impressed across the electrodes to create a radio frequency field. The paperboard layers may be stationary or moving with respect to the electrodes while in the RF field.

A wide range of radio frequencies may be employed, such as between 10 and 100 megacycles, or more or less if desired. However, radio frequices between 25 and 35 megacycles are preferred. Generators may be selected to suit the desired speed of travel of the paperboard layers or the sealing needs, and may vary from ½ kw. units, or less, to 20 kw., or more if needed. Generally, for most carton sealing, 1 kw. to 10 kw. generators may be employed. Voltage requirements may also vary to suit the particular carton or container sealing needs or the available power. Successful RF sealing has been accomplished with 110, 220, and 440 volts. The voltage is usually not considered decisive to good sealing but generally is selected with respect to the kw. output of the generator. The higher kw. output generators will generally be connected to 220 or 440 volt lines; the lower kw. output generators to 110 or 220 volt lines. Frequency and kw. rating are the more important factors in creating an effective RF field.

Among the many aqueous-based adhesives that can be employed are polyvinyl acetate resin emulsion, polyvinyl alcohol resin emulsion, co-polymer or blend of polyvinyl acetate and polyvinyl alcohol resin emulsions, with or without tackifiers, plasticizers or other modifiers. Other adhesives may be acrylic resin emulsion, natural or synthetic latex, or emulsions containing thermo-setting resins such as ureaformaldehyde, phenol- or resorcinol-formaldehyde, and others. Still other adhesives may be starches, dextrins, tapioca, and other water-soluble glues.

Sealing time will depend upon a variety of factors, but fiber-tearing bonds between waxed paperboard layers have been made in as little as $\frac{1}{10}$ of a second in the RF field under favorable conditions. Times of ¼, ½, 1 second, and 2 seconds in the RF field for the production of fiber-tearing bonds are obtainable under a wide variety of conditions.

It is postulated that the heat generated by the RF field in the water-based adhesive and in the paperboard, if the paperboard is water-containing, is very quickly—almost immediately—conducted to the wax, which generally is "non-lossy" (i.e., not activated by RF), causing it to melt. Being of low viscosity near or at its melt point, the wax flows away from the seal area, exposing paperboard fibers for the setting adhesive to latch onto and secure. In effect, there is an almost simultaneous dewaxing of the paperboard in the seal area and drying of the adhesive. Under some conditions, the adhesive is already set and a fiber-tearing bond produced as soon as the electrodes are moved away from the assembly, even without post-pressure. The nature of the adhesive, adhesive solids, amount and nature of the wax, the thickness of the paperboard are among the factors that influence the speed of set of the adhesive, in addition to kw. output and frequency.

Direct RF heat has many advantages over conventional heat, such as is supplied by a heated platen that transfers its heat by conductance. A primary advantage is speed. Other important advantages are that with RF, wax and paperboard scorching is avoided along with the resultant wax unsightliness and off-odors. It is extremely important to prevent discoloration of the container. Carton manufacturers and food packagers spent great amounts of money to obtain foodboard as white as possible by subjecting the foodboard to bleaching or other processes. Additional money is spent to add optical brightness to make the container even whiter because of market demand.

When, for example, it is considered that two layers of .026″ waxed paperboard, totalling .052″, must be joined to fabricate a KD half-gallon ice cream carton on carton fabricating equipment or that three layers of .026″ of rather heavily waxed paperboard totalling .078″ must be joined to seal the gabled top of a Pure-Pak style waxed half-gallon milk carton on automatic packaging machinery, it can be appreciated why conventional heat has never been commercially successful for sealing the waxed surfaces. Rather, conventional heat is first applied to remove the wax on the carton, and then the side-seam is joined. Staples are then used to join the waxed layers of the gabled top of the milk carton.

When it is required to use two layers of waxed corrugated or solid fiber, each layer .040″ to .100″ thick, it may be appreciated that it would be virtually impossible to commercially seal the mated layers employing heated platens. Staples, and in some occasions, tape are used commercially to fabricate waxed corrugated or solid fiber boxes on automatic container fabricating equipment. Further advantages of the inventive process are that the wax adjacent the seal area, which performs important waterproofing functions for the carton, remains relatively undisturbed, and printing on the carton is not damaged.

In another embodiment of the invention no external adhesive is employed. Rather, ingredients are blended into the wax before it is applied to the paperboard to raise the viscosity of the wax to the point where it will be viscous and tacky near or at its melt point. Thus, instead of flowing away from the seal area when heat is applied, it behaves much like a plastic film. It becomes tacky and plastic-like. When the RF field is removed and the wax cools, it seals either to itself or to board fibers.

The additives that convert wax from a free-flowing liquid near or at its melt point to a comparative non-flowing, tacky, plastic-like mass are most favorably, though not limited to, co-polymers of ethylene with vinyl acetate or ethyl acrylate. Some of these additives are dielectrically responsive and are heated by a direct field radio frequency field. Additionally, tackifiers, usually mutually compatible resins, such as the polyterpenes, styrene co-polymers, polyhydro-carbons, or resin derivatives may be incorporated in the wax blend to develop faster and better heat sealability.

The following examples are illustrative of the practice of this invention:

EXAMPLE I

A printed folding carton blank, lock-end, tube style, such as is used for packaging half-gallon ice cream, of .026″ solid bleached sulphate foodboard was "hot" waxed by passing it through a folding carton blank hot waxing machine. About ½ lb./M s.f. of paraffin wax M.P. 135° F. was applied to both surfaces of the paperboard. A thin layer of a commercial polyvinyl acetate resin emulsion adhesive was deposited over the waxed bottom surface of the paperboard along the manufacturer's joint. The black was then folded over along the appropriate score so that two layers of waxed paperboard were in intimate face-to-face contact, the bottom surface of one layer directly opposing the top surface of the other layer, with the aqueous adhesive therebetween. This assembly was then placed under pressure between two electrodes connected to a 1 kw. radio frequency generator operating off of a 110 volt line. Using 0.75 kw. at 35 megacycles, the assembly was maintained under 2 p.s.i. pressure in a direct RF field of 0.75 kw. and 35 megacycles for one second and for an additional one second after the RF field had been shut off. A fiber-tearing bond was obtained.

EXAMPLE II

A series of the same type of waxed carton blanks as in Example I was subjected to a variety of sealing conditions. Pressure was varied from 1 p.s.i. to 10 p.s.i.; power was varied from 0.5 to 0.9 kw.; RF time was varied from 1/10 to 2 seconds; post-pressure time was varied from zero to 2 seconds. In all instances, fiber-tearing or partial fiber-tearing bonds were produced.

EXAMPLE III

The materials, procedure, and assembly of Example I were duplicated but a 28 megacycle radio frequency was employed. A fiber-tearing bond was obtained.

EXAMPLE IV

The same materials, procedure and assembly as used in Example I were duplicated, using, however, a commercial dextrin adhesive in lieu of the polyvinyl acetate resin emulsion. A fiber-tearing bond was obtained.

EXAMPLE V

A square foot specimen of .016″ clay-coated solid bleached sulphate foodboard was cold waxed on an International Cold Waxer with about 5½ lbs./M s.f. 139° F. M.P. paraffin wax, containing 3% by weight polyethylene. The sheet was cut into strips about ½″ wide. A commercial polyvinyl acetate resin emulsion adhesive was superposed over the waxed top surface of one strip and the waxed bottom surface of a second strip placed over it in direct face-to-face contact. This assembly was then placed under 6 p.s.i. pressure between 2 electrodes and subjected to a direct RF field generated by 1.3 kw. at 28 megacycles at 220 volts for 0.5 second. After the RF field was removed, pressure was maintained for 1 second. A fiber-tearing bond was obtained.

EXAMPLE VI

The gabled top of a commercial waxed half gallon Pure-Pak milk carton produced by wax dipping .026″ solid bleached sulphate milk carton stock was cut off the carton and the staples removed. Two layers of a commercial polyvinyl acetate resin emulsion adhesive were interposed between the three layers of the waxed paperboard and subjected to a direct RF field generated by 1.2 kw. at 28 megacycles at 220 volts for 1 second at 5 p.s.i. pressure. Pressure was maintained for 1 second after the RF field was removed. Fiber-tearing bonds between the three layers were obtained in the area where adhesive had been interposed between the layers.

EXAMPLE VII

A sheet of corrugated board, such as is used for packaging hydro-cooled vegetables, that had been heavily impregnated with a blend of paraffin and microcrystalline wax was cut into ¾″ wide strips. Two strips were placed into direct face-to-face contact with a thin layer of a commercial polyvinyl acetate-polyvinyl alcohol resin emulsion adhesive therebetween, maintained under one p.s.i. pressure, and subjected to a direct RF field impressed across two electrodes by 2 kw. at 35 megacycles at 440 volts for 1 second. The pressure was maintained for 1 second after the RF field was removed. A fiber-tearing bond was produced.

EXAMPLE VIII

A sheet of solid fiber, such as is used in certain meat boxes, about .080″ thick, was curtain coated on the bottom surface with a paraffin wax of about 135° F. M.P. containing about 5% low molecular weight polyethylene and 2% Polymekon. The sheet was cut into strips about ¾″ wide. A commercial polyvinyl acetate resin emulsion adhesive was spread over the waxed bottom surface and brought into direct face-to-face contact with the unwaxed top surface. The assembly was then placed between 2 electrodes under 2 p.s.i. pressure and an RF field generated by .2 kw. at 35 megacycles at 440 volts was impressed upon it for 2 seconds. Pressure was maintained for 1 second after the RF field was shut off. A fiber-tearing bond was obtained.

EXAMPLE IX

A sheet of printed .018″ solid bleached sulphate paperboard was cast waxed with a blend of paraffin wax, ethylene-vinyl acetate co-polymer, and a polyterpene resin. The sheet was cut into ½″ wide strips. The waxed top surface of one strip was placed on top of the waxed bottom surface of a second strip, and the two strips thus mated were placed between 2 electrodes under 1.5 p.s.i. and subjected to an RF field created by 0.75 kw. at 35 megacycles at 220 volts for 0.3 second. After the RF field was shut off, pressure was maintained for 0.7 second. A seal was obtained with spotty fiber tear.

EXAMPLE X

The experiment of Example IX was repeated except that the waxed top surface of one strip was placed on top of the waxed top surface of the second strip. Under the same conditions in the RF field, a fiber-tearing bond was obtained.

While in the foregoing specification I have set forth a detailed description of embodiments of the invention for purposes of explanation, it will be apparent to those skilled in the art that many variations in the details thereof may be made without departing from the spirit and scope of the invention.

I claim:
1. In a method of uniting two waxed paperboard surfaces, the steps of depositing on at least one of said surfaces a water-based adhesive, bringing said surfaces together in confronting relationship with said adhesive interposed therebetween, positioning said surfaces between electrodes in a direct radio frequency field in the megacycle range while said surfaces are subject to pressure, and maintaining said field and said pressure until at least some of the wax on said surfaces melts and flows away under the influence of said pressure and said adhesive is fused to said surfaces.

2. The method of claim 1 in which the frequency employed is between 10 and 100 megacycles.

3. The method of claim 1 in which the pressure is at least 1 pound per square inch.

4. The method of claim 1 including the step of maintaining said surfaces under said pressure after the surfaces are removed from the radio frequency field.

5. The mehtod of claim 1 in which said adhesive is a polyvinyl resin emulsion.

6. In a method of uniting two paperboard surfaces, the steps of applying wax to said surfaces, said wax containing an additive to make said wax viscous and tacky near the melt point thereof, bringing said surfaces together in confronting relationship, positioning said surfaces between electrodes in a direct radio frequency field in the megacycle range while said surfaces are subjected to pressure, and maintaining said field and said pressure until said wax is tackified and said surfaces are fused together.

7. The method of claim 6 in which said paperboard contains water.

8. The method of claim 7 in which said water comprises between 5 and 8% by weight of said paperboard.

9. The method of claim 6 in which said additive includes a co-polymer of ethylene.

10. The method of claim 6 in which said additive is dielectrically responsive to direct radio frequency field.

References Cited

UNITED STATES PATENTS

| 3,188,257 | 6/1965 | Hecht | 156—273 |
|---|---|---|---|
| 2,631,642 | 3/1953 | Richardson et al. | 156—69 |
| 3,113,899 | 12/1963 | Hoag et al. | 156—273 |
| 3,291,671 | 12/1966 | Hecht | 156—273 |

DOUGLAS J. DRUMMOND, Primary Examiner